United States Patent Office 2,716,130
Patented Aug. 23, 1955

2,716,130

SYNTHESIS OF PANTOTHENIC ACID-2′ PHOSPHATE

James Baddiley and Eric Malcolm Thain, London, England, assignors to National Research Development Corporation, London, England, a British corporation No Drawing. Application November 26, 1951, Serial No. 258,308

Claims priority, application Great Britain December 4, 1950

6 Claims. (Cl. 260—461)

This invention relates to a process for the synthesis of N-(2′,4′-di-hydroxy - 3′:3′ - dimethylbutyro)-$\beta$-alanine-2′ phosphate which is more shortly known as pantothenic acid-2′ phosphate and will be referred to as such throughout this specification.

Pantothenic acid, one of the vitamins of the "B" group (Lipmann, Kaplan, Novelli, Tuttle and Guirard, J. Biol. Chem., 1947, 167, 869), is liberated by the hydrolysis of active concentrates of the so-called "coenzyme A" which is a cofactor of general occurrence in certain enzymatic acetylation processes fundamental to the metabolism of living systems. The presence of this co-factor has been shown to be necessary for the acetylation of aromatic amines by liver preparations (Lipmann, Fed. Proc., 1945, 4, 97: J. Biol. Chem., 1945, 160, 173), for the acetylation of choline in brain (Lipmann and Kaplan, J. Biol. Chem., 1946, 162, 743) and in other biological acetylation systems (Stern and Ochoa, J. Biol. Chem., 1949, 179, 491). It has been found that intestinal phosphatase and pigeon liver extracts inactivate coenzyme A with the liberation of pantothenic and phosphoric acids and hence it seems probable that the coenzyme is a phosphorylated derivative of pantothenic acid. Coenzyme A itself stimulates the growth of *Acetobacter suboxydans*, a property which is destroyed by treatment with intestinal phosphatase. The present invention is concerned with the synthesis of pantothenic acid-2′ phosphate which it was thought might be identical with the lever extract degradation product of coenzyme A, but since the synthesized phosphate does not stimulate the growth of *Acetobacter suboxydans*, it would appear that it is not so identical. It has been found, however, to have marked pharmacological effects upon gut in which it causes contraction of the ileum and it is thought that the product may have considerable medical significance.

It has previously been proposed to phosphorylate pantothenic acid directly with phosphoryl chloride to give a diphosphate (Woolley, J. Biol. Chem., 1940, 134, 461). Since however, the selective protection of single hydroxyl groups in pantothenic acid itself, followed by phosphorylation and the removal of protecting groups, leads to difficult degradation studies in order to locate exactly the position of the protecting groups, it is desirable to simplify the synthesis by avoiding the utilisation of preformed pantothenic acid. Such a simplified process has previously been proposed in which pantolactone was directly phosphorylated with diphenyl-chlorophosphonate, the product being submitted to hydrogenation and subsequent condensation with sodium $\beta$-alanine. This process, however, resulted in very small yields of the pantothenic acid 2′-phosphate.

It is an object of the present invention to provide a process for the synthesis of pantothenic acid 2′-phosphate in good yield.

According to the invention there is provided a process for the synthesis of pantothenic acid-2′ phosphate comprising the steps of phosphorylating 3:3 dimethylbutyro-$\gamma$-lactone (pantolactone) with a diaryl halogeno-phosphonate, treating the resultant pantolactone-2-diaryl phosphate to remove the aryl groups and produce pantolactone-2-phosphate, condensing the pantolactone-2-phosphate with an ester of $\beta$-alanine containing a free amino group and isolating pantothenic acid-2′ phosphate from the reaction mixture thus obtained. The large yields of pantothenic acid-2′ phosphate resulting from the process of the invention are thought to be mainly due to the use of an ester of $\beta$-alanine as opposed to a metallic derivative thereof.

The isolation of the pantothenic acid-2′ phosphate may conveniently be effected by precipitation as a metallic salt.

The phosphorylation of the pantolactone may conveniently be effected by reaction with diphenyl-chlorophosphonate in a basic solvent such as anhydrous pyridine at a low temperature for example between 0° C. and 10° C. The reaction may, however, be effected at a temperature as low as −5° C. without materially affecting the yield of the end product-pantothenic-acid-2′ phosphate. The yield of the end product is greatest and the time taken for the phosphorylation least, when the reaction temperature is approximately 0° C. Alternatively any convenient basic solvent, other than pyridine, may be used, such for example, as collidine or lutidine. Such a reaction results in the production of a pantolactone-2 diphenyl-phosphate which may be purified by distillation at low pressure.

The two aryl groups of pantolactone-2 diaryl phosphate may be removed by hydrogenolysis or alkaline hydrolysis to give pantolactone-2′ phosphate. This phosphate may then, for example, be heated with an excess of a $\beta$ alanine benzyl or alkyl ester under anhydrous conditions to form a benzyl or alkyl ester of pantothenic acid-2′ phosphate as a salt of the $\beta$ alanine benzyl or alkyl ester.

The crude ester of pantothenic acid-2′ phosphate may then be isolated as, for example, the barium salt, and it is to be noted that during the isolation process part of the benzyl or alkyl groups appears to be lost through hydrolysis. The removal of the benzyl or alkyl groups may then be completed by hydrogenolysis or hydrolysis and the pantothenic acid-2′ phosphate is isolated in good yield as its barium salt.

In order that the invention may be more readily understood there follows an example of an experimental synthesis of pantothenic acid-2′ phosphate.

EXAMPLE

The synthesis takes place in three stages as follows:

(1) *Preparation of pantolactone-2 diphenyl phosphate (3:3-dimethylbutyro-$\gamma$ lactone-2 diphenyl phosphate)*

8.5 gms. of diphenyl-chlorophosphonate were added slowly to a stirred solution of 4 gms. of pantolactone in 40 cc. of anhydrous pyridine at 0° C. After standing for 1 hour at 0° C. and 12 hours at normal room temperature, i. e., 15° C., 10 cc. of water were added and the resulting solution evaporated under reduced pressure and at a temperature below 45° C. The residue was then dissolved in 60 cc. of chloroform, washed successively with dilute sulphuric acid, sodium hydrogen carbonate solution and water and finally evaporated under reduced pressure. The syrupy residue crystallised on standing. The crystallised phosphate was purified either by recrystallisation from ether-light petroleum (B. P. 40–60° C.), from which it crystallised as prisms, M. P. 70° C., or by sublimation in a short-path still at 150° C. and a pressure of 10–5 mm. The yield was 10 gms. (90%).

(2) Preparation of pantolactone 2-phosphate, 3:3-dimethylbutyro-γ-lactone-2 phosphate A solution of 11 gms. of the pantolactone-2 diphenyl phosphate in 200 cc. of acetic acid was hydrogenated at atmospheric pressure and room temperature in the presence of a platinum oxide catalyst. After absorption of hydrogen had ceased (8 mols. were absorbed at a flow rate of about 900 cc. per hour), the catalyst was filtered off and the solvent removed by distillation at reduced pressure. The residue crystallised as needles on standing and traces of acetic acid were removed by rubbing with ether. The phosphate had a melting point of 130–140° C. The yield was 5.6 gms.

(3) Pantothenic acid-2' phosphate 3.8 gms. of the pantolactone-2 phosphate were mixed with 12.8 gms. of dry, freshly prepared β alanine benzyl ester (prepared by the method of Kuhn and Wieland), and the mixture was heated at 100° C. for 6 hours with the exclusion of moisture and carbon dioxide. The reaction mixture was then cooled to room temperature, dissolved in 50 cc. of water and 107 cc. of 0.34 N barium hydroxide solution were added. After evaporation to a small volume under reduced pressure 150 cc. of alcohol were added and the precipitated barium salt centrifuged, washed twice with alcohol, then once with ether and dried in an oven at 100° C. Addition of a further 60 cc. of the barium hydroxide solution to the mother liquors precipitated a further quantity of the barium salt which was centrifuged and combined with the first precipitate. The combined barium salts were then dissolved in 60 cc. of water and carbon dioxide was passed through the solution. The small amount of insoluble material produced at this stage was removed by centrifugation and the crude barium salt precipitated by the addition of alcohol, then centrifuged, washed successively with alcohol and ether and dried at 100° C. (6.9 g., 75%). Dilute sulphuric acid was added to 5.7 gms. of the barium salt dissolved in 100 cc. of water until barium ions had been completely removed from solution (rhodizonic acid indicator), barium sulphate was separated by centrifugation and washed twice with cold water. Combined washings and supernatant were diluted with alcohol (100 cc.) and hydrogenated at room temperature and atmospheric pressure in the presence of a palladium oxide catalyst. When hydrogen absorption had ceased the catalyst was filtered off and barium hydroxide solution was added to pH 8. After evaporation to about 40 cc. under reduced pressure alcohol (150 cc.) was added and the precipitated barium salt collected by centrifugation. This was redissolved in water (50 cc.), a small amount of insoluble material was removed by centrifugation and the barium salt reprecipitated by the addition af alcohol. The barium salt was collected, washed with alcohol and ether and dried as before (5.0 g.). Further purification was effected by dissolving in the minimum quantity of cold water, heating to 100° C., filtering off some of the precipitated barium salts (the barium salts referred to are more soluble in cold water than in hot) and adding alcohol to the filtrate to precipitate the purified material. Repetition of this process yielded a pure barium salt of pantothenic acid-2' phosphate.

We claim:

1. A method of producing pantothenic acid 2'-phosphate comprising intimately contacting pantolactone 2-phosphate with an ester of beta-alanine having the amino group unsubstituted; hydrolyzing the ester thus obtained to pantothenic acid 2'-phosphate; and isolating pantothenic acid 2'-phosphate from the reaction mixture thus obtained.

2. A method as claimed in claim 1, in which the pantolactone 2-phosphate and the beta-alanine ester are reacted at a temperature of about 100° C.

3. A method as claimed in claim 2, in which the pantothenic acid 2'-phosphate is isolated as one of its metallic salts.

4. A method as claimed in claim 3, in which the pantothenic acid 2'-phosphate is precipitated as the barium salt from aqueous-alcoholic solution at least once.

5. A method as claimed in claim 3, in which the beta-alanine ester is beta-alanine benzyl ester.

6. A method as claimed in claim 3, in which the beta-alanine ester is a beta-alanine alkyl ester.

References Cited in the file of this patent

Woolley: J. Biol. Chem., v. 134, pp. 461-2 (1940).